H. T. DAVIS.
Churn.

No. 218,667.　　　　　Patented Aug. 19, 1879.

Attest:
Geo. T. Smallwood Jr
Walter Allen

Inventor:
Henry T. Davis
By Knight Bros
attys

UNITED STATES PATENT OFFICE.

HENRY T. DAVIS, OF SHERMAN, TEXAS.

IMPROVEMENT IN CHURNS.

Specification forming part of Letters Patent No. 218,667, dated August 19, 1879; application filed June 12, 1879.

*To all whom it may concern:*

Be it known that I, HENRY T. DAVIS, of Sherman, in the county of Grayson, State of Texas, have made new and useful Improvements in Churns, of which the following is a specification.

My improved churn is constructed with a vertical dasher, operated by hand in the customary manner, but of peculiar construction. The dasher-head consists of a perforated bell, which is reversible on the staff, for gathering the butter. At the bottom of the dasher is a pivoted star-shaped wheel with oblique arms, similar to a screw-propeller, adapted to turn rapidly within the cream as the dasher is moved up and down. Fixed on the staff above the wheel, and in position to be covered by the perforated bell while in churning position, is a chamber of double conical shape, adapted for the reception of hot or cold water or ammonia for raising or lowering the temperature of the cream, as may be necessary. The upper part of the dasher is provided with a sliding rubber stopper, by which the opening in the churn-top can be conveniently and effectively closed.

In order that my invention may be fully understood, I proceed to describe it with reference to the accompanying drawings, in which—

Figure 1:
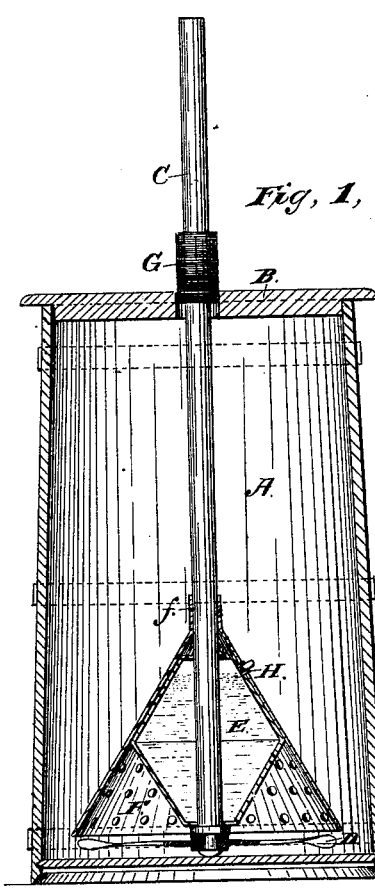
Figure 2:
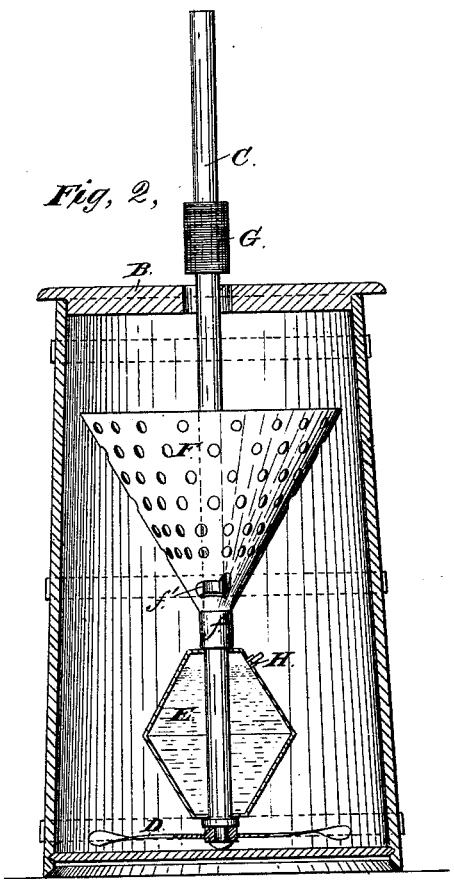
Figure 3:
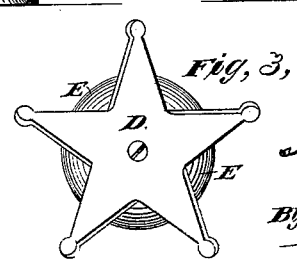

Figure 1 is a vertical section of the churn with the dasher in churning position and the aperture of the top closed by the gum stopper. Fig. 2 is a vertical section showing the perforated bell in elevation, inverted in position for gathering butter. Fig. 3 is an underside view of the dasher with the bell removed, showing the star-shaped propeller-wheel.

A represents a churn-tub of common form; B, its cover; C, the dasher-staff; D, a star-shaped propeller-wheel with oblique arms, turning freely on the bottom end of the staff. E is a water-chamber, of double conical shape, fixed to the dasher-staff directly above the propeller-wheel, and having a plugged nozzle, H, through which it may be filled with hot or cold water, or ammonia, or ice, or other material, for warming or cooling the cream, as may be desirable. F is a perforated bell-shaped dasher-head, formed with a collar, *f*, to slip over the dasher-staff, said bell being adapted to fit the upper cone of the water-vessel E, while its lower part flares outward and downward from said vessel when the bell is in churning position, as shown in Fig. 1, leaving an annular cavity around the margin of the bell for action upon the cream. The perforated bell is further provided with an L-shaped opening, *f'*, near its smaller end, and adapted to fit over the nozzle H or to fix the bell F to the chamber E, after the manner of a bayonet-joint.

G is an annular stopper, of india-rubber or other material, adapted to slide freely on the staff C, so as to stop the aperture, when desired, as shown in Fig. 1.

For gathering butter the perforated bell is placed in the reversed position shown in Fig. 2. The butter floating on the buttermilk will then overflow the margin of the bell and gather on its inside, the buttermilk running out through the apertures in the bell until all the butter is collected, when the dasher may be again withdrawn and the butter emptied out into the working-bowl.

I am aware that churns have before been made with a perforated bell-shaped dasher and an inverted frusto-conic plate fixed beneath the same, so as to form, in connection with the bell, an inclosed chamber, and underneath the same an annular cavity, for acting on the cream. This I, therefore, do not broadly claim.

Having thus described my invention, the following is what I claim as new and desire to secure by Letters Patent:

1. The combination of the staff C, the double conical chamber E, and the removable and reversible perforated bell F, as and for the purposes specified.

2. The combination of the staff C, perforated bell F, double conical chamber E, and propeller-wheel D.

HENRY T. DAVIS.

Witnesses:
 OCTAVIUS KNIGHT,
 WALTER ALLEN.